United States Patent [19]
Schroeder

[11] 3,855,678
[45] Dec. 24, 1974

[54] METHOD OF MAKING WOVEN SHEET FOR RUBBER REINFORCEMENT

[75] Inventor: Charles F. Schroeder, Toledo, Ohio

[73] Assignee: Owens-Corning Fiberglas Corporation, Toledo, Ohio

[22] Filed: May 12, 1971

[21] Appl. No.: 142,663

Related U.S. Application Data

[62] Division of Ser. No. 777,817, Nov. 21, 1968, abandoned.

[52] U.S. Cl............. 28/74 R, 139/420 C, 152/358, 161/93
[51] Int. Cl. .................... D03d 15/00, D06c 27/00
[58] Field of Search............ 139/420 C, 425, 426 R; 161/93; 28/74 R, 75 R; 152/355, 358

[56] References Cited
UNITED STATES PATENTS

| | | | |
|---|---|---|---|
| 1,875,445 | 9/1932 | Hall.................................. | 139/426 R |
| 2,893,442 | 7/1959 | Genin......................... | 139/420 C X |
| 2,951,277 | 9/1960 | Youngs.......................... | 161/93 UX |
| 3,391,052 | 7/1968 | Marzocchi ...................... | 28/75 R X |
| 3,464,459 | 9/1969 | Ballard......................... | 139/426 R X |
| 3,530,904 | 9/1970 | Ballard......................... | 139/426 R X |
| 3,556,844 | 1/1971 | Marzocchi ........................ | 161/93 X |
| 3,575,761 | 4/1971 | Funsch et al..................... | 28/74 R UX |

FOREIGN PATENTS OR APPLICATIONS

| | | | |
|---|---|---|---|
| 1,077,624 | 8/1967 | Great Britain .................. | 139/425 R |

*Primary Examiner*—Robert R. Mackey
*Attorney, Agent, or Firm*—Carl G. Staelin; John W. Overman; Paul F. Stutz

[57] ABSTRACT

A method of producing a fabric containing organic yarns and glass yarns so woven that the composite reinforcement is extensible, due to the inherent stretchability of the organic yarns and due to the particular configuration in placement and orientation of the glass component, until the glass component is in line with the direction of tensile force, whereupon the glass yarns assume the load; the organic yarns having, in the meantime, become stretched to some point short of the elastic limit or to its ultimate elastic limit.

15 Claims, 12 Drawing Figures

PATENTED DEC 24 1974

INVENTOR.
CHARLES J. SCHROEDER
BY
ATTORNEYS

METHOD OF MAKING WOVEN SHEET FOR RUBBER REINFORCEMENT

This is a division of co-pending application Ser. No. 777,817, filed Nov. 21, 1968, now abandoned in favor of application Ser. No. 149,060, filed June 1, 1971, now U.S. Pat. No. 3,707,120, issued Dec. 26, 1972.

A large variety of textile materials have been employed as interior reinforcement members for rubber elastomeric bodies such as tires, industrial belts and other mechanical rubber goods such as mountings, bushings, shear members, shock absorbers, etc. The conventional textile materials included cotton, rayon, the polyamides, e.g., the various types of nylon, the polyesters, polypropylene, etc. Fine steel wire and, more recently, glass have likewise been employed in certain applications. It is, of course, recognized that all of these various materials have inherent properties which lend or impart a particular capability or strength for a particular application. Also, of course, these materials are known to have certain disadvantageous properties or weaknesses.

The properties, both good and bad, of the known natural occurring and synthetic textile materials can be ascertained from any available reference work and will not be repeated herein.

The most important desirable properties of glass considered as a candidate reinforcement material include (for a glass filament): (1) substantially 100 percent elasticity, (2) extremely limited yielding under stress, (3) excellent dimensional stability and (4) virtual immunity to change due to atmospheric conditions such as moisture and, as well, heat.

It must be recognized, however, that glass has a number of other characteristics and/or properties which are markedly at contrast when compared with the properties of the conventional organics. Numerically, glass has a stiffness of 322 grams per denier (gpd) while nylon ranges from 18–23 gpd, polyesters range from 11–21 gpd, the acrylics such as ACRILAN and ORLON range from 7–10 gpd, viscose rayon varies from 11 to about 25 gpd. Glass has a relatively low breaking elongation in the neighborhood of 3–4 percent whereas the polyesters range from 19–30 percent nylon ranges from 16–40 percent, the acrylics from 36–40 percent and viscose rayon from 9–30 percent. Glass also has a high specific gravity measuring 2.54 compared to 1.14 for nylon, 1.5 for rayon and from 1.22 to 1.38 for the polyesters such as KODEL and DACRON. Additionally, glass has a toughness value of 0.07 on a denier basis compared to nylon's 0.75, rayon's 0.20, DACRON polyesters' 0.5 and acrylic ORLON'S 0.4. It can be appreciated from the foregoing that any contemplation of the use of glass as a reinforcement must proceed on the basis of a consideration of these quite different properties entailing therefor the determination of the ideal geometric, e.g., spatial, location of the glass within the body, either alone or in combination with other materials, in order to achieve an effective and, in many ways, a superior reinforcement.

With the foregoing introduction, it is the general object of the present invention to provide a unique woven fabric combination of galss strands and strands of various organic, synthetic or natural filament material.

It is still another object of the present invention to provide a reinforcement system for elastomeric, rubber-like bodies, particularly belts, tires and like bodies which are subject to dynamic stresses in use; which system employs twisted-together subelements such as glass and, as well, the other candidate reinforcement materials combined in such fashion and in conjunction with other features of arrangement as provide a maximization in achievement of the inherent property of the material and, as well, a minimization of the not so desirable properties of the candidate reinforcement material.

It is also an object of the present invention to provide a sheet good comprising an elastomeric vulcanizable matrix having embedded therein a woven fabric inclusive of glass yarns and yarns of a stretchable synthetic organic or natural occurring material and featuring a pattern of weave as lends particularly desirable properties when subjected to dynamic stress conditions.

It is a particular object of the present invention to provide a vulcanized elastomeric product having embedded therein a reinforcement system as described in further detail hereinafter.

It is also an object of the present invention to provide a tire construction featuring ply reinforcements composed of a woven fabric employing the system as described herein.

It is yet another object of the present invention to provide a reinforcement system which embodies the advantageous properties of certain organics with advantageous properties of glass yarns while at the same time minimizes the otherwise undesirable properties of these materials.

The foregoing, as well as other objects of the present invention, will become apparent to those skilled in the art from the following detailed description taken in conjunction with the annexed sheets of drawings on which there are illustrated several embodiments of the reinforcement sheet good of the present invention and including an illustration of a product reinforced in accordance with and employing the sheet good of the present invention.

IN THE DRAWINGS

Considered most simply, the present invention envisions a woven product containing glass and organic yarns combined in a pattern characterized in that, considered in an unwoven state, the glass strand in a given increment of length of woven material is longer than the organic strand in the same increment of woven length. Further, the present invention embodies the concept of embedding such fabric as reinforcement in an elastomeric matrix.

Figure 1:
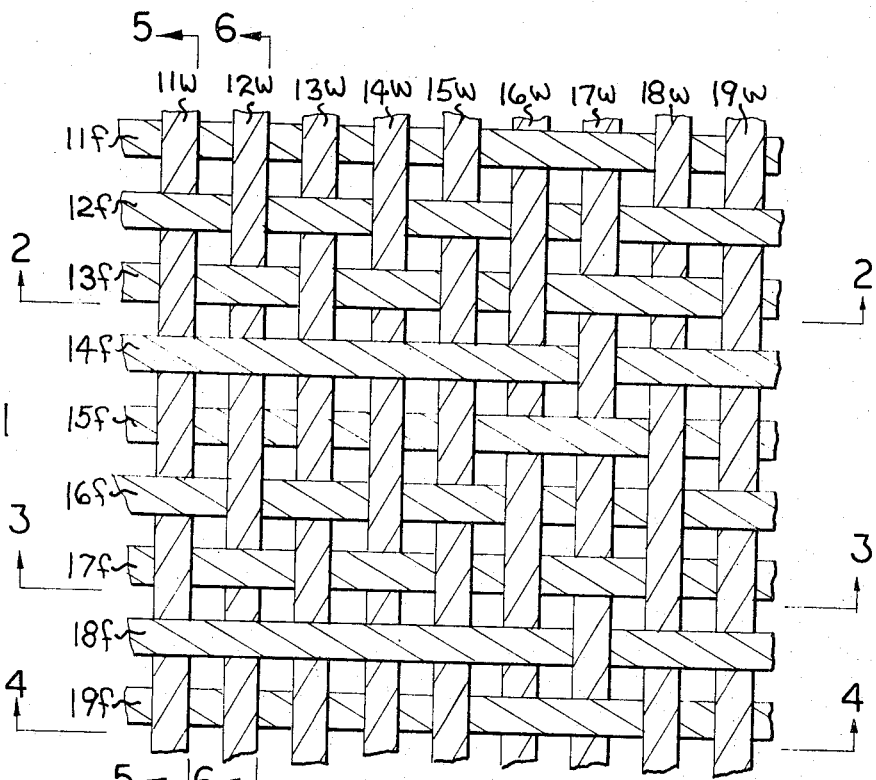
FIG. 1 is a plan view illustrating in schematic fashion a woven pattern embodying features of the present invention.

Referring now to the drawings, there is shown in FIG. 1 a woven fabric in which the "warp" strands extending vertically in the drawings are identified by the reference numerals $11w$, $12w$, $13w$, $14w$, $15w$, $16w$, $17w$, $18w$ and $19w$ and the "woof" (also commonly referred to as "weft") or fill yarns (extending horizontally) are identified by the reference numerals $11f$, $12f$, $13f$, $14f$, $15f$, $16f$, $17f$, $18f$ and $19f$. As reference to FIGS. 1 and 5 reveal, warp strand $11w$ and, as well, warp strands $13w$, $15w$, $17w$ and $19w$ are alike in that the pattern of weave may be described as a repeating "over and under" path. Thus, referring to FIG. 5, warp strand $11w$ proceeds over fill strand $11f$ and under fill strand $12f$, over fill strand $13f$ and under fill strand $14f$, etc. Warp strands $11w$, $13w$, $15w$, $17w$ and $19w$ in accordance with the present invention are all glass strands. Reference to FIG. 6 reveals that warp strand $12w$ proceeds in a pattern which may be described as over fill strand $19f$, under side-by-side fill strands $18f$ and $17f$, over fill strands $16f$ and $15f$, then under fill strands $14f$ and $13f$, finally over fill strands $12f$ and $11f$. Warp strand $12w$ in accordance with the present invention is an organic strand capable of elongation; for example, nylon, rayon, polyester, polypropylene, etc., as described more fully hereinafter.

Figure 2:
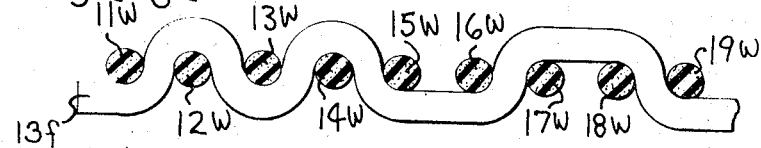
FIG. 2 is a sectional view taken on line 2—2 of FIG. 1.

FIG. 2 illustrates in combination with FIG. 1 the path of fill strand $13f$ which passes under warp strand $11w$, over warp strand $12w$, under warp strand $13w$, over warp strand $14w$, then under side-by-side, adjacent warp strands $15w$ and $16w$, thence over side-by-side adjacent warp strands $17w$ and $18w$, finally under warp strand $19w$.

Figure 3:
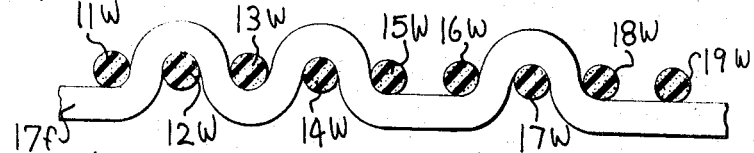
FIG. 3 is a sectional view taken on line 3—3 of FIG. 1.

In FIG. 3, fill strand $17f$ follows a different pattern which is an under, over, under and over pattern with respect to warp strands $11w$, $12w$, $13w$ and $14w$. Thence, the fill strand $17f$ passes underneath both side-by-side warp strands $15w$ and $16w$, thence over warp strand $17w$ and thence finally under warp strands $18w$ and $19w$.

Figure 4:
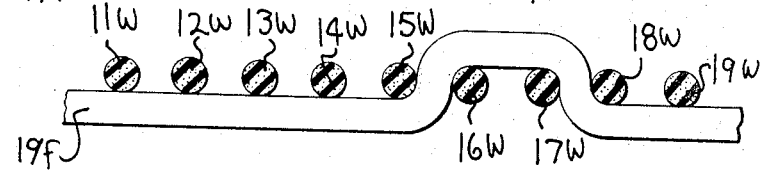
FIG. 4 is a sectional view taken on line 4—4 of FIG. 1.

In FIG. 4, fill strand $19f$ passes underneath all of warp strands $11w$, $12w$, $13w$, $14w$ and $15w$ and thence over side-by-side, adjacent warp strands $16w$ and $17w$ and thence underneath side-by-side warp strands $18w$ and $19w$. In accordance with the present invention, fill strands $13f$, $17f$ and $19f$ are all formed of an organic material such as nylon or the like.

Figure 5:
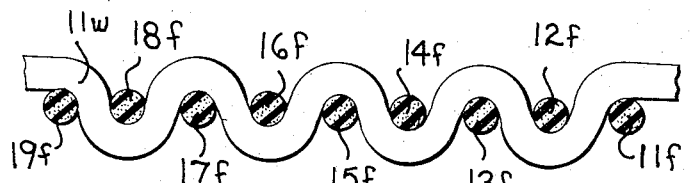
FIG. 5 is a sectional view taken on line 5—5 of FIG. 1.
Figure 6:
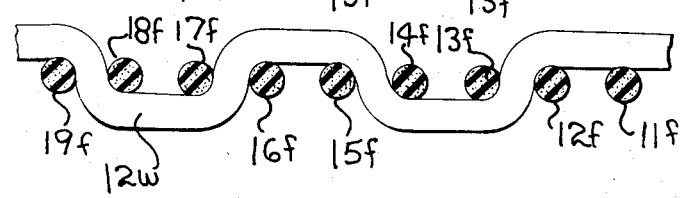
FIG. 6 is a sectional view taken on line 6—6 of FIG. 1.

Referring to FIGS. 5 and 6, it will be appreciated that the warp strand $11w$ in the unwoven condition is longer than the warp strand $12w$ since its pattern of weave is more convoluted than the warp strand $12w$. Thus, if the warp strands $11w$ and $12w$ as shown were removed from the segment of woven material as shown and straightened out into unwoven configuration, the warp strand $11w$ would be longer than the warp strand $12w$.

It will further be appreciated that tension imposed on a fabric composed of a plurality of warp strands $11w$ and $12w$ in side-by-side, alternating relationship would result in the load being first borne by the warp strands $12w$ since they are the shorter of the two. In accordance with the present invention, a fabric is constructed so that the strands in the woven pattern which are shorter are formed of a stretchable organic such as nylon and the like, while the yarns which are longer as exemplified by the warp strand $11w$ are formed of a less stretchable material such as glass. As a result of such a construction, tensile forces imposed on the reinforced member by reason of a particular load will be imposed on the organic strands first. The stretchable organic will elongate while resisting the tension forces. Finally, when the fabric has stretched to the point that the glass strands are straight or in alignment with the direction of the tensile force, the glass strands will assume the load. Ideally, the character of the weave and the selection of the particular organic are matched so that the glass strands do not assume the load until the organic strands have about reached their elastic limit whereby the fabric reinforcement is capable of enduring a load which is beyond the capabilities of either the organic yarn or the yarn composed of glass filaments alone.

The repetitive "over" and "under" or "up" and "down" pattern has been illustrated with respect to warp yarns in FIG. 1. It will be appreciated that the woof or fill yarns may likewise be designed so that certain thereof are formed of glass and exhibit a repetitive pattern of ups and downs as compared to other fill yarns exhibiting a less frequent pattern of ups and downs. Thus, the fabric may feature the combination of glass and organic strands in the warp direction or it may feature the combination of glass and organic strands in the woof or fill direction and, in some cases, in both directions.

It will be appreciated that complex patterns featuring combinations of the relatively nonstretchable glass yarns and the relatively stretchable organic yarns may be designed employing the known multiple shuttle looms as manufactured, for example, by Crompton & Knowles of Worchester, Massachusetts, or the known "shuttleless" or "jet" looms manufactured, for example, by The Draper Corporation of Greensboro, North Carolina.

The composite woven sheet material featuring both strands of glass and organic emanating from a particular loom can be subjected to a calendering operation to embed the woven fabric in a matrix of rubber. Calendering operations, equipment and techniques being well known in the art, such will not be described in detail either in the specification or the drawings.

The ultimate calender coated fabric may be cut on appropriate cutting devices into appropriate geometric shapes, such as rectangles, trapezoids, strips, bands, etc., and incorporated into elastomeric products of various and sundry types. For example, the material may be cut into suitably sized carcass plies for tires or into strips for belt members employed in special regions of the tire in the course of the tire building process, etc.

Reference is now directed to FIGs. 7–10 for examples of additional weave patterns featuring strands formed of a multiplicity of gathered-together filaments of glass and strands formed of organic filaments or yarns.

Figure 7:
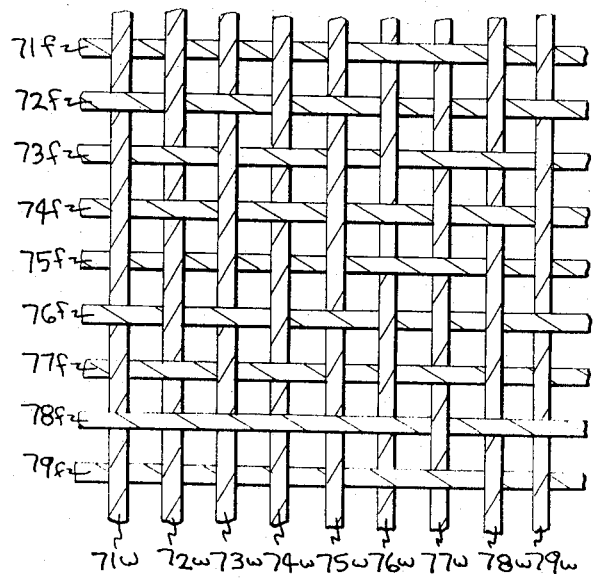
FIGS. 7–10 are diagrammatic plan views showing various weave patterns to illustrate a few of the many patterns representative of the present invention.

In FIG. 7, warp strands $71w$, $73w$, $75w$, $77w$ and $79w$ are formed of a multiplicity of glass filaments, while warp strands $72w$, $74w$, $76w$ and $78w$ are formed of organic yarn. The glass strands are woven in a pattern having a frequency of ups and downs which is greater than the frequency of ups and downs exhibited by the organic strands. The foregoing is readily revealed by an inspection of FIG. 7. In addition, woof or fill yarn 74f exhibits a large frequency of ups and downs as compared, for example, to woof strand 72f or 71f. As a consequence of the above construction, a product reinforced with a sheet good featuring the weave pattern as described, when subjected to tensile forces, would first be reinforced by the organic yarns which would elongate while the more convoluted glass strands become straight and finally assumed the tensile load as the organic yarns approached their elastic limit.

Figure 8:
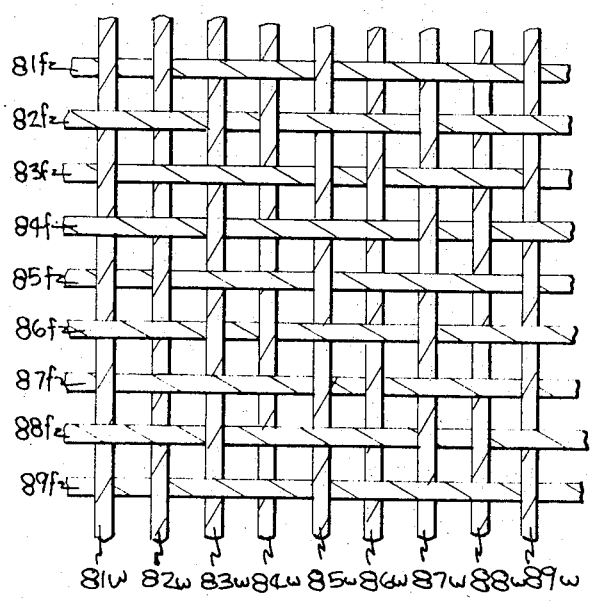

In FIG. 8, warp strands 81w, 83w, 85w, 87w and 89w are of alternate up and down or over and under weave with respect to the fill yarns and consequently in accordance with the present invention are desirably composed of glass strands. The in-between warp yarns 82w, 84w, 86w and 88w do not exhibit the frequency of over and under pattern as the glass strands and are desirably selected from organic yarns.

Figure 9:
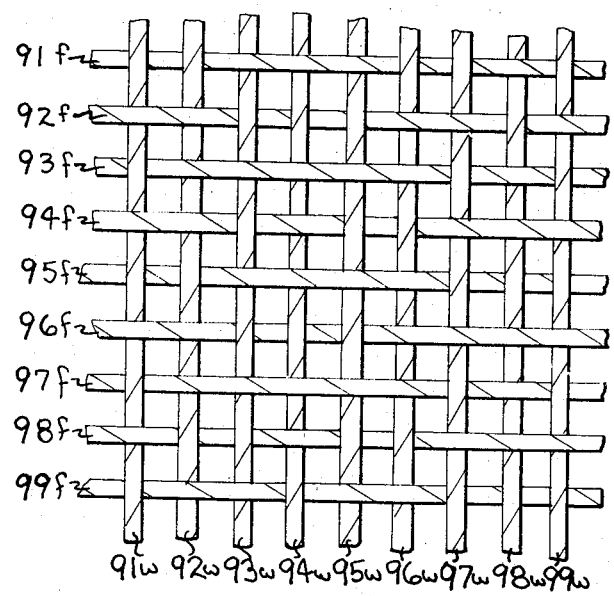

Similarly, in FIG. 9, the more convoluted warp strands 91w, 93w, 95w, 97w and 99w are formed of glass strand material while the in-between less convoluted yarns 92w, 94w, 96w and 98w are formed of organic material.

Figure 10:
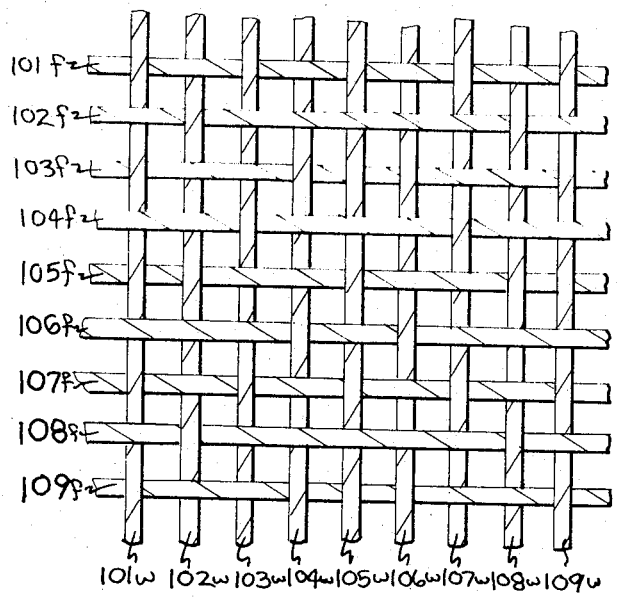
Figure 12:
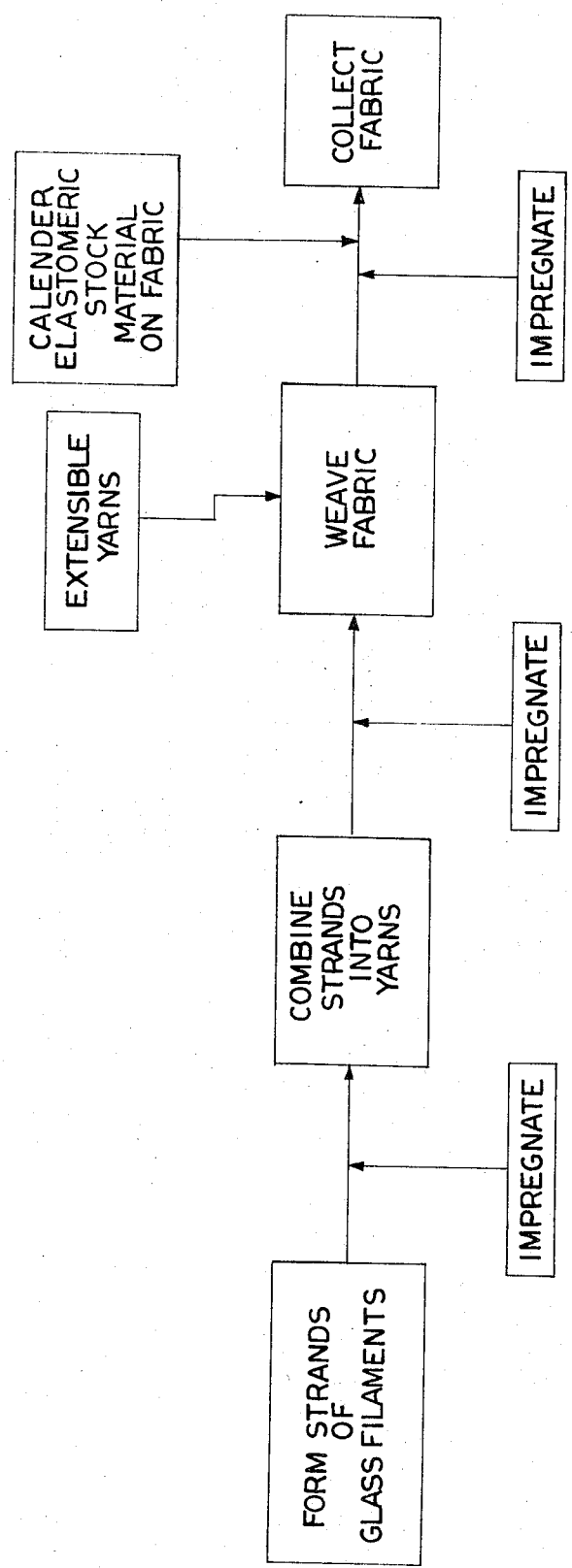
FIG. 12 is a diagrammatic flow chart of the steps of the method in accordance with a preferred embodiment of the present invention.

In FIG. 10, the weave pattern illustrated is composed of warp strands 101w, 105w and 109w which are of the maximum frequency of ups and downs and are desirably formed of glass strand material, while the warp strands 102w, 103w, 104w, 106w, 107w and 108w are formed of organic since the frequency of ups and downs is less. In the woof or fill direction, the woof strand 101f and the woof strand 107f exhibit the greater frequency of ups and downs as compared to the other woof strands and are desirably fabricated of a multiplicity of glass filaments.

Any sheet good of the weave pattern of FIG. 10 would exhibit the physical characteristics in accordance with the present invention in both directions. In other words, the sheet good in tension in alignment with either the warp strands or the woof or fill strands would find the initial load being borne by the organic yarn strands and the ultimate tensile forces being borne by the glass.

The galss filaments employed in the glass strands and yarsn are desirably treated initially; that is, before being woven. Desirably, they are treated as formed; namely, when collectively drawn from the usual multi-orifice platinum bushing containing the molten glass. A bushing formed of platinum may contain in the bottom wall thereof a large plurality, usually 204, 408, and up to 2,000, of individual orifices. A single glass filament is pulled from each of these orifices by a winder situated below. The pulling attenuates the glass into filaments of extremely fine diameter. The filaments are drawn together into a common strand just prior to being wound on the spool. A suitable treatment involves a spraying of the filaments at this point, that is, just prior to gathering together, with a liquid composition containing an anchoring agent, for example, an amino silane, such as gamma-aminopropyltriethoxy silane; a mercapto substituted organoalkoxy silane; a glycidoxy silane, such as gamma-glycidoxypropyltrimethoxy silane; or a carboxyl group and/or an unsaturated group containing silane, such as gamma-methacryloxypropyltrimethoxy silane. A Werner type compound complexed to contain an amino, a carboxyl or other active hydrogen containing organic group may be used as the anchoring agent. A typical treatment composition is composed of 0.5 – 2.0 percent by weight of gamma-aminopropyltriethoxy silane, 0.3 – 0.6 percent by weight of a lubricant and the remainder water. The treated strand on the spool package is frequently combined with a plurality of like strands to form a yarn. For example, a plurality of from two to 10 strands, each composed of several hundred glass filaments, are combined, usually with some amount of twist, to form a strand suitable for use as a component of the present invention. The glass strand may also be formed of a combination of multiple yarn subassemblies; each of the subelement yarns being formed of several hundred glass filaments so that the combined yarn is a multiple of the subelements.

The treated multifilament strand may be combined with the organic in a suitable loom or it may, under certain circumstances, be most preferable to first treat the multifilament strand with a compatible impregnant material, usually by passing the strand through a bath of the impregnant which is metered on by passing the impregnated strand through a suitable wiping die. A suitable impregnant bath is composed of 60 – 40 parts by weight of a 38 percent dispersed solids system including a butadiene-styrene-vinyl pyridine terpolymer latex, a butadiene styrene latex and a resorcinol-formaldehyde resin; all dispersed in 39 parts by weight of water. A commercially available product which has been employed as an impregnant bath in the manufacture of combination yarn materials is marketed by Uniroyal under the trade name "LOTOL 5440."

In accordance with another embodiment of the present invention, the yarns are not impregnated as strand material but only treated with the anchoring agent composition as described hereinabove, after which it is combined into the woven fabric material which is then impregnated as a sheet material by a passing of the sheet through an impregnant bath as described. In either event, the impregnated strand or the impregnated fabric is heated to dry the impregnant and additionally partially cure or vulcanize the elastomeric component of the impregnant in order to improve the ultimate compatibility with the elastomeric body in which it is embedded as a reinforcement. The drying and heating of the impregnant material is accomplished usually in a horizontal oven featuring an internal temperature of from 600° – 900°F. A residence time in the furnace of usually less than a minute is sufficient to dry the impregnant and also thermally advance the state of vulcanization as to enhance its ultimate compatibility with the product in which it is the reinforcement. Variations in time and temperature may be necessitated, depending upon the selection of the particular impregnant used. The degree of drying and/or partial curing or vulcanization can be established readily by trial and error. Generally, a state of dryness or lack of tackiness will be desired in order to promote the adaptability of the material for further processing, e.g., the weaving operation.

In some cases, it is desirable, particularly in the case of the single strand impregnation, to apply a metallic salt material, such as stearate, to the strand just following heating in order to reduce tackiness.

The synthetic organic yarn materials may be selected from a wide variety of available materials having a degree of elongation suitable for the particular application, having in mind the proportion of organic, the character or pattern of the weave and the amount of the glass strand material present in the ultimate fabric.

Reference to any standard reference work will reveal the breaking elongation characteristic of the synthetic organic materials and, as well, the natural occurring yarns such as cotton and wool. Rayon, of course, is also a material which may and is used in combination with glass. In this regard, it may be noted that high tenacity polyester such as DACRON has a breaking elongation of 10 – 14 percent. High density polyethelene (one of the olefin family) has a breaking elongation of 10 – 20 percent. Polypropylene has a breaking elongation of 15 – 25 percent. The fluorocarbon marketed under the trade name "TEFLON" has a breaking elongation of 13 percent, while cotton has a breaking elongation of 3 – 7 percent which is just greater than the breaking elongation of fiber glass. As indicated, the elongation value considered with the character or pattern of the weave and the relative amounts of the yarn are balanced to yield an ultimate sheet good capable of exhibiting the desired controlled elongation followed by resistance to elongation.

Figure 11:
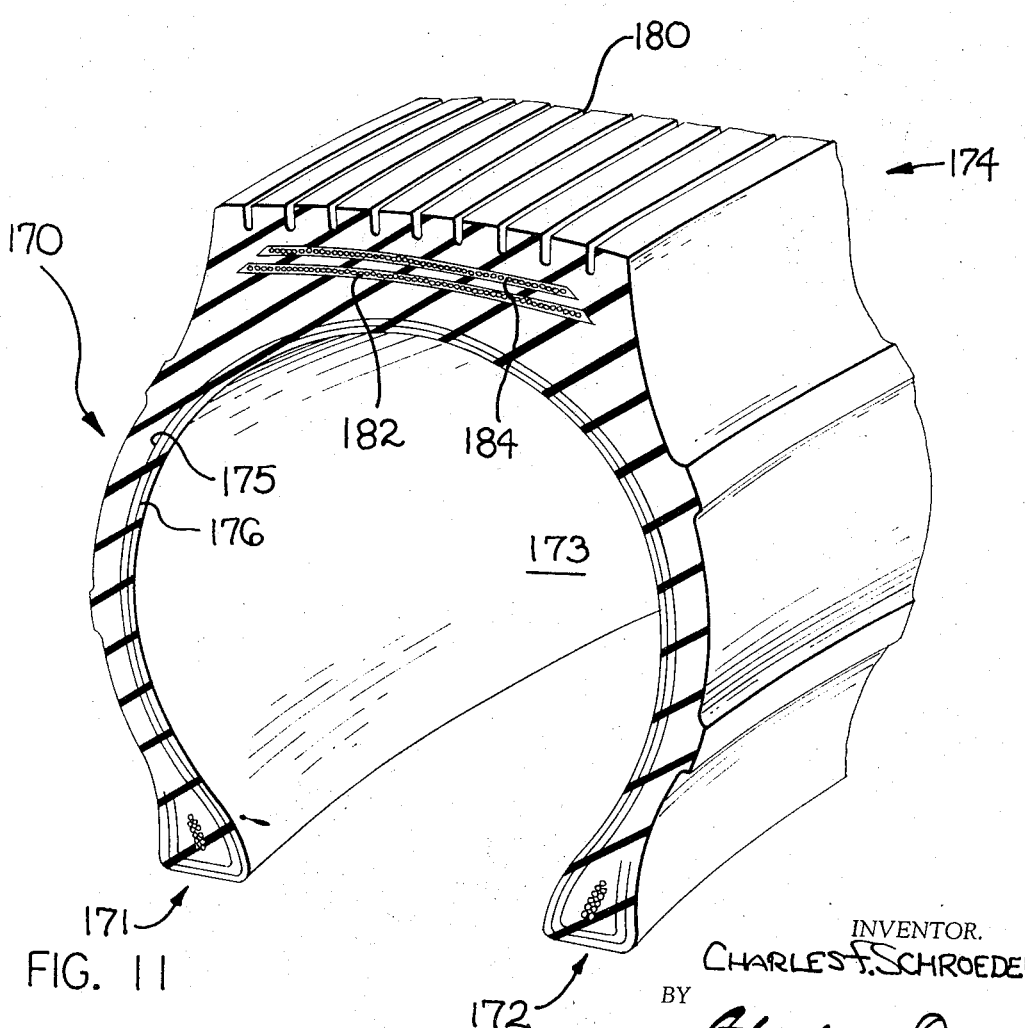
FIG. 11 is a three-quarter perspective view of a segment of a tire shown in cross-section.

In FIG. 11, there is illustrated a tire 170. The tire represents a fairly common elastomeric product which is subjected to dynamic stress and is a structure desirably reinforced in accordance with the reinforcement system of the present invention. The tire, as may be seen, is composed of spaced beads 171 and 172 connected by a toroidal carcass 173. The carcass bears, at its crown portion, a tread 174. The strength of the carcass is contributed by a pair of carcass plies 175 and 176 which extend from bead to bead and are turned up about the beads as illustrated. The tire construction illustrated includes a pair of breaker plies or belt strips 182 and 184 which extend from shoulder to shoulder and are situated between the uppermost carcass ply 175 and the tread; the latter including a plurality of side-by-side grooves 180 which lend traction and rolling stability.

In accordance with the present invention, one or the other or both of the carcass plies 175 and 176 may be fabricated of a reinforcement member in accordance with the present invention. The belt plies 182 and 184 or either of them are likewise desirably formed of a reinforcement sheet good in accordance with the present invention.

It is within the purview of the present invention to subject the woven fabric material, as, for example, illustrated in FIG. 1, to a treatment such as heat which will cause a shrinkage of the organic component of the composite fabric. Many of the organic materials mentioned possess and/or exhibit shrinkage upon exposure to an elevated temperature. Isotactic polypropylene, for example, exhibits 40 percent shrinkage at 165°F. Other organic materials exhibit shrinkage upon exposure to other conditions or stimuli such as excitation as produced by exposure to a given wave energy, e.g., electric field, or exposure to a given atomic particle bombardment. The shrinkage of certain strands of a composite fabric of the construction as described results in a phenomena wherein the glass component would exhibit a greater degree of convolution due to the fact that the glass itself does not shrink upon exposure to heat. It may also be observed that the glass strands in the fabric will exhibit a "bulking" effect which, under certain circumstances, will enhance the physical securement of the composite fabric in the rubber product, e.g., the matrix, in which it is embedded as a reinforcement member.

It is within the purview of the present invention that the particular attributes can be obtained with a combination of strands, neither of which is glass but one of which is less stretchable than the other, since the phenomena described hereinabove is observable with such a combination. Thus, the stretchable strand will elongate when subjected to tension while the other more highly convoluted strand, by reason of the greater number of ups and downs, will move into alignment with the direction of the applied tension and finally assume the load caused by continued elongation. A combination fabric wherein a percentage or proportion of the strands is glass, however, is preferred by reason of the ultimate strengh of glass and also by reason of the resistance to moisture, mildew, elevated temperatures, etc.

It will be appreciated that a wide variety of choices are available to those skilled in the art in the selection of the particular material, the selection of particular materials in combination and the selection of the particular weave pattern and, as well, the selection of the proportion of various materials. For example, a composite fabric may be manufactured from two, three and even four or more basic materials of varying elongation properties, thereby resulting in a fabric exhibiting gradual, or step-by-step, increase in stress loading of the fabric as progressive elongation occurs. Such fabrics including glass fiber yarns or strands lend themselves admirably for such uses as safety belts where an ultimate limit in stretchability or "bottoming out" is desired. A safety belt, as referred to, is a woven structure which has the general appearance illustrated in any of FIGS. 1, 7, 8, 9 or 10, considered as a greatly enlarged illustration.

It is also within the purview of the present invention to form a woven fabric inclusive of strands of continuous glass filaments and strands of discontinuous glass filaments known in the fiber glass art as staple fiber strands. The latter strands are inherently more stretchable than the former. In keeping with the teachings herein, the strands of continuous glass filaments would feature a pattern of weave in which the strands of continuous glass filaments are more convoluted, e.g., a greater number of ups and downs per given length of woven fabric, than the strands of discontinuous or staple fibers.

In the light of the foregoing disclosure, it is apparent that a large number of variations in the techniques and constructions as described will be suggested to those skilled in the art and, accordingly, all such are intended to be included within the present invention unless clearly violative of the language of the appended claims.

I claim:

1. The method of making a reinforcement member for rubber and rubber-like goods, said method comprising:

forming strands of gathered-together filaments of glass, combining a plurality of said strands to form a first yarn, forming a woven fabric including, in one direction, a plurality of said first yarns and, in parallel relationship, second yarns of a material having an extensibility greater than said glass, said fabric defining a pattern in which both first and second yarns sinuously engage with the other components of the fabric and in which the yarns of glass filaments are longer and exhibit a sinuosity which is greater than the sinuosity of said second yarns, which are accordingly shorter per unit length of fabric than said first yarns, whereby a tensile load imposed on said fabric in the said direction will be borne first by said second yarns, causing a simultaneous elongation of said second yarns and a straightening out of the originally more sinuous glass yarns until said glass yarns assume a part of said tensile load, and collecting the resulting woven sheet good.

2. The method as claimed in claim 1, which includes the step of calendering elastomeric stock material on said resulting woven sheet good.

3. The method as claimed in claim 1, one of said combined plurality of strands or said first yarns is impregnated with a vulcanizable elastomeric impregnant prior to forming into a woven fabric.

4. The method as claimed in claim 1, wherein said resulting woven sheet good is passed through an impregnant bath of a vulcanizable elastomeric impregnant.

5. The method as claimed in claim 1, wherein said second yarns are formed of an extensible material selected from the group consisting of organic, synthetic and natural materials.

6. The method as claimed in claim 1, wherein the second yarns include different yarns of different elongation.

7. The method as claimed in claim 1, wherein said filaments of glass are continuous and said yarns having an extensibility greater than glass are formed of staple strands of glass.

8. The method as claimed in claim 7, wherein said resulting woven sheet good is passed through an impregnant bath of a vulcanizable elastomeric impregnant.

9. The method as claimed in claim 7, wherein said yarns of continuous and staple glass are impregnated with a vulcanizable elastomeric impregnant prior to forming into a woven fabric.

10. The method of making a reinforcement member for rubber and rubber-like goods, said method comprising:

forming strands of gathered-together filaments of glass, treating said strands of glass filaments with an anchoring agent, weaving a fabric which includes in either the warp or fill direction said treated strands and, in parallel relationship therewith, yarns of a material having an extensibility greater than said glass, said weaving resulting in a woven fabric having a pattern in which the aforementioned strands and yarns sinuously engage with the other components of the fabric and in which the strands of glass filaments exhibit a sinuosity which is greater than the sinuosity of the yarns formed of other material, said strands of glass having a greater length per unit length of fabric than the yarns of more extensible material by reason of said sinuosity, whereby a tensile load imposed on said fabric axially with respect to said strands and yarns will be borne first by said more extensible yarns, causing a simultaneous elongation of said more extensible yarns and a straightening out of the originally more sinuous glass strands until said glass strands assume a part of said tensile load, and collecting the resulting woven sheet good.

11. The method as claimed in claim 10, wherein said formed woven fabric is passed through an impregnant bath inclusive of a vulcanizable elastomeric impregnant.

12. The method as claimed in claim 10, wherein said anchoring agent is selected from the group consisting of amino silanes, Werner type compounds complexed to contain an amino, carboxyl or other active hydrogen-containing organic group.

13. The method as claimed in claim 10, wherein said strands of glass filaments are impregnated with a vulcanizable elastomeric impregnant prior to forming into a woven fabric.

14. The method as claimed in claim 10, wherein the second yarns include different yarns of different elongation.

15. The method as claimed in claim 14, wherein said second yarns are formed of an extensible material selected from the group consisting of organic, synthetic and natural materials.

* * * * *